(12) United States Patent
Li et al.

(10) Patent No.: US 9,571,382 B2
(45) Date of Patent: Feb. 14, 2017

(54) METHOD, CONTROLLER, AND SYSTEM FOR PROCESSING DATA PACKET

(71) Applicant: Huawei Technologies Co., Ltd., Shenzhen (CN)

(72) Inventors: Jianfei Li, Beijing (CN); Yulong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 14/616,825

(22) Filed: Feb. 9, 2015

(65) Prior Publication Data

US 2015/0156107 A1 Jun. 4, 2015

Related U.S. Application Data

(63) Continuation of application No. PCT/CN2013/071327, filed on Feb. 4, 2013.

(30) Foreign Application Priority Data

Aug. 31, 2012 (CN) .......................... 2012 1 0318795

(51) Int. Cl.
*G01R 31/08* (2006.01)
*H04L 12/705* (2013.01)
(Continued)

(52) U.S. Cl.
CPC ........... *H04L 45/18* (2013.01); *H04L 12/1877* (2013.01); *H04L 12/1886* (2013.01); *H04L 47/12* (2013.01); *H04L 47/32* (2013.01)

(58) Field of Classification Search
USPC ....... 370/252, 389, 401, 222, 230, 235, 390, 370/392, 428, 216, 229, 236, 254, 315, 370/328, 338, 352, 395.4, 400, 408, 411, 370/412, 473
See application file for complete search history.

(56) References Cited

U.S. PATENT DOCUMENTS

2004/0153520 A1* 8/2004 Rune ................... H04L 12/4616
709/206
2005/0268331 A1* 12/2005 Le .......................... H04L 63/20
726/11

(Continued)

FOREIGN PATENT DOCUMENTS

CN 1996939 A 7/2007
CN 101917298 A 12/2010
(Continued)

OTHER PUBLICATIONS

Method and Processor for Restraining Internet Storm, CN102215170A in English by Machine Translation, published Oct. 12, 2011, pp. 1-8.*

(Continued)

*Primary Examiner* — Phuongchau Ba Nguyen
(74) *Attorney, Agent, or Firm* — Conley Rose, P.C.

(57) ABSTRACT

A method, a controller, and a system for processing a data packet are disclosed. The method includes receiving, by a controller, a data packet that is reported by a switch and does not match a forwarding rule; after it is determined that a type of the data packet is a broadcast data packet, generating a forwarding rule for the data packet, where the forwarding rule includes an action attribute being discarded; and sending the forwarding rule of the data packet to the switch, so that when receiving the data packet again, the switch discards the data packet according to the action attribute of the forwarding rule. In the present invention, a broadcast storm on a network can be avoided without shielding a port of a switch. Therefore, for a fully-connected network, a forward- (Continued)

ing capability of a port and a quantity of available transmission links on the network are ensured.

13 Claims, 7 Drawing Sheets

(51) Int. Cl.
    *H04L 12/18*    (2006.01)
    *H04L 12/801*   (2013.01)
    *H04L 12/823*   (2013.01)

(56) References Cited

U.S. PATENT DOCUMENTS

2008/0130503 A1   6/2008   Kaempfer
2009/0257434 A1  10/2009   Song et al.
2009/0257448 A1  10/2009   Zijst

FOREIGN PATENT DOCUMENTS

CN     102196365 A    9/2011
CN     102215170 A   10/2011

OTHER PUBLICATIONS

Partial English Translation and Abstract of Chinese Patent Application No. CN102196365A, May 28, 2015, 3 pages.
Partial English Translation and Abstract of Chinese Patent Application No. CN102215170A, Mar. 24, 2015, 6 pages.
Kim, C., et al., "Floodless in Seattle: A Scalable Ethernet Architecture for Large Enterprises," Journal ACM Transactions on Computer Systems, vol. 29, No. 1, Feb. 2011, 14 pages.
Foreign Communication From a Counterpart Application, PCT Application No. PCT/CN2013/071327, English Translation of International Search Report dated Jun. 13, 2013, 2 pages.
Foreign Communication From a Counterpart Application, PCT Application No. PCT/CN2013/071327, English Translation of Written Opinion dated Jun. 13, 2013, 10 pages.
Foreign Communication From a Counterpart Application, Chinese Application No. 201210318795.1, Chinese Office Action dated Mar. 4, 2016, 7 pages.

\* cited by examiner

METHOD, CONTROLLER, AND SYSTEM FOR PROCESSING DATA PACKET

CROSS-REFERENCE TO RELATED APPLICATIONS

This application is a continuation of International Application No. PCT/CN2013/071327, filed on Feb. 4, 2013, which claims priority to Chinese Patent Application No. 201210318795.1, filed on Aug. 31, 2012, both of which are hereby incorporated by reference in their entireties.

TECHNICAL FIELD

The present invention relates to the field of network communications technologies, and in particular, to a method, a controller, and a system for processing a data packet.

BACKGROUND

Generally, a data center uses a fully-connected network structure to improve network communications efficiency. One type of fully-connected network structure may be as follows. Switches at different layers are connected in a pairwise mode, and each switch at the bottom layer is connected to a certain quantity of hosts. When a switch on a network receives a broadcast data packet, flooding needs to be performed on the broadcast data packet on all ports except a receiving port in a virtual local area network (VLAN) to which the switch belongs. However, when a loop exists on a fully-connected network, a broadcast data packet may be repeatedly broadcasted on the loop, which causes a broadcast storm.

The fully-connected network may be implemented based on a software defined network (SDN) technology. A network applying the SDN technology generally includes several network devices and a controller controlling the network devices. The core of the SDN is to separate a control plane of a network device (for example, a switch) from a data forwarding plane of the network device, where the data forwarding plane performs data forwarding based on a flow table, and the control plane provides an application programming interface (API) for the controller to perform control. On an SDN network, a routing table in a switch is empty at an initial stage. When a forwarding rule matching a received data packet cannot be found from the routing table of the switch, the switch requests a forwarding rule by reporting the data packet to a controller, forwards the data packet according to a forwarding rule delivered by the controller, and stores the forwarding rule in the routing table. Generally, the default forwarding rule delivered by the controller to the switch is broadcasting the data packet. Referring to FIG. 1, FIG. 1 is a schematic diagram of an SDN-based fully-connected network architecture. In FIG. 1, each S represents a switch, and there are two layers of switches, namely, core switches and access switches; each h represents a host connected to an access switch; and a controller is connected to each switch, switches at different layers are connected in a pairwise mode, and each access switch is connected to two hosts.

To avoid a broadcast storm, in the prior art, data on a network may be broadcasted over the Spanning Tree Protocol (STP). When STP is used, a network topology is constructed for switches on the network according to a tree structure; one switch is selected from the tree structure and is used as a root bridge device; all switches form a tree starting from the root bridge device; the root bridge device sends a configuration packet on a timed basis; after a non-root bridge device receives the configuration packet, the non-root bridge device re-calculates configuration information, and forwards the configuration packet. If a switch can receive the configuration packet from more than two ports, there is more than one transmission link from the switch to the root bridge device, and a forwarding loop is formed between the switch and the root bridge device. In this case, the switch selects one port and shields other ports, so as to eliminate the forwarding loop on the network.

During the study on the prior art, the inventor discovers that because a switch needs to avoid occurrence of a broadcast storm by shielding ports, forwarding capabilities of the ports on the network are suppressed, which is equivalent to that, for a fully-connected network, a quantity of available transmission links on the network is reduced, thereby reducing a utilization rate of the transmission links on the network.

SUMMARY

Embodiments of the present invention provide a method, a controller, and a system for processing a data packet, so as to solve a problem in the prior art that a utilization rate of a network link is reduced when STP is used to suppress a broadcast storm.

To solve the foregoing technical problem, the embodiments of the present invention disclose the following technical solutions.

In a first aspect, a method for processing a data packet is provided, where the method includes receiving, by a controller, the data packet that is reported by a switch and does not match a forwarding rule; after it is determined that a type of the data packet is a broadcast data packet, generating a forwarding rule for the data packet, where the forwarding rule includes an action attribute being discarded; and sending the forwarding rule of the data packet to the switch, so that when receiving the data packet again, the switch discards the data packet according to the action attribute of the forwarding rule.

With reference to the first aspect, in a first possible implementation manner, the forwarding rule further includes aging time, so that the switch discards the data packet when receiving the data packet again within the aging time.

With reference to the first aspect or the first possible implementation manner, in a second possible implementation manner, before the generating a forwarding rule for the data packet, the method further includes determining that attribute information of the data packet matches set attribute information, where the set attribute information includes at least one piece of the following information: a protocol type, a source address, a destination address, a source port number, a destination port number, a virtual local area network identifier (VLAN ID), a VLAN priority, and an Ethernet type.

With reference to the first aspect or the first possible implementation manner, in a third possible implementation manner, before the sending the forwarding rule of the data packet to the switch, the method further includes setting the action attribute of the data packet to broadcast; and sending the data packet to the switch, so that the switch broadcasts the data packet according to the action attribute of the data packet.

With reference to the first aspect, or the first possible implementation manner, or the second possible implementation manner, or the third possible implementation manner, in a fourth possible implementation manner, the forwarding rule includes at least one piece of the following information of the data packet: a protocol type, a source address, a destination address, a source port number, a destination port number, a VLAN ID, a VLAN priority, an Ethernet type, and a service type.

In a second aspect, a controller is provided, where the controller includes a receiving unit configured to receive a data packet that is reported by a switch and does not match a forwarding rule; a determining unit configured to determine that a type of the data packet received by the receiving unit is a broadcast data packet; a generating unit configured to, after the determining unit determines that the type of the data packet is a broadcast data packet, generate a forwarding rule for the data packet, where the forwarding rule includes an action attribute being discard; and a sending unit configured to send the forwarding rule of the data packet generated by the generating unit to the switch, so that when receiving the data packet again, the switch discards the data packet according to the action attribute of the forwarding rule.

With reference to the second aspect, in a first possible implementation manner, the forwarding rule generated by the generating unit further includes aging time, so that the switch discards the data packet when receiving the data packet again within the aging time.

With reference to the second aspect or the first possible implementation manner, in a second possible implementation manner, the determining unit is further configured to, when it is determined that attribute information of the data packet matches set attribute information, trigger the generating unit to execute generating a forwarding rule for the data packet, where the set attribute information includes at least one piece of the following information: a protocol type, a source address, a destination address, a source port number, a destination port number, a VLAN ID, a VLAN priority, and an Ethernet type.

With reference to the second aspect or the first possible implementation manner, in a third possible implementation manner, the controller further includes a setting unit configured to set the action attribute of the data packet received by the receiving unit to broadcast; and the sending unit is further configured to send, to the switch, the data packet of which action attribute is set to broadcast by the setting unit, so that the switch broadcasts the data packet according to the action attribute of the data packet.

In a third aspect, a system for processing a data packet is provided, where the system includes a controller described in an embodiment of the present invention and a plurality of switches connected to the controller, the plurality of switches form a ring network, and any one switch of the plurality of switches is a first switch; and the first switch is configured to receive a forwarding rule of a data packet sent by the controller, where an action attribute of the forwarding rule of the data packet is discard; and is further configured to discard, after receiving the data packet again, the data packet according to the action attribute of the forwarding rule of the data packet.

In the embodiments of the present invention, when a switch receives a data packet and does not match a forwarding rule of the data packet, the switch reports the data packet to a controller; when determining that the data packet is a broadcast data packet, the controller generates a forwarding rule for the data packet, and sends the forwarding rule to the switch, where the forwarding rule includes an action attribute being discarded. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

BRIEF DESCRIPTION OF THE DRAWINGS

To describe the technical solutions in the embodiments of the present invention more clearly, the following briefly introduces the accompanying drawings required for describing the embodiments. A person of ordinary skill in the art may still derive other drawings from these accompanying drawings without creative efforts.

DETAILED DESCRIPTION

The following embodiments of the present invention provide a method, a controller, and a system for processing a data packet.

To help those skilled in the art better understand the technical solutions provided in the embodiments of the present invention and make the objectives, features, and advantages of the present invention more comprehensible, the following further describes the technical solutions provided in the embodiments of the present invention in detail with reference to the accompanying drawings.

Figure 1:
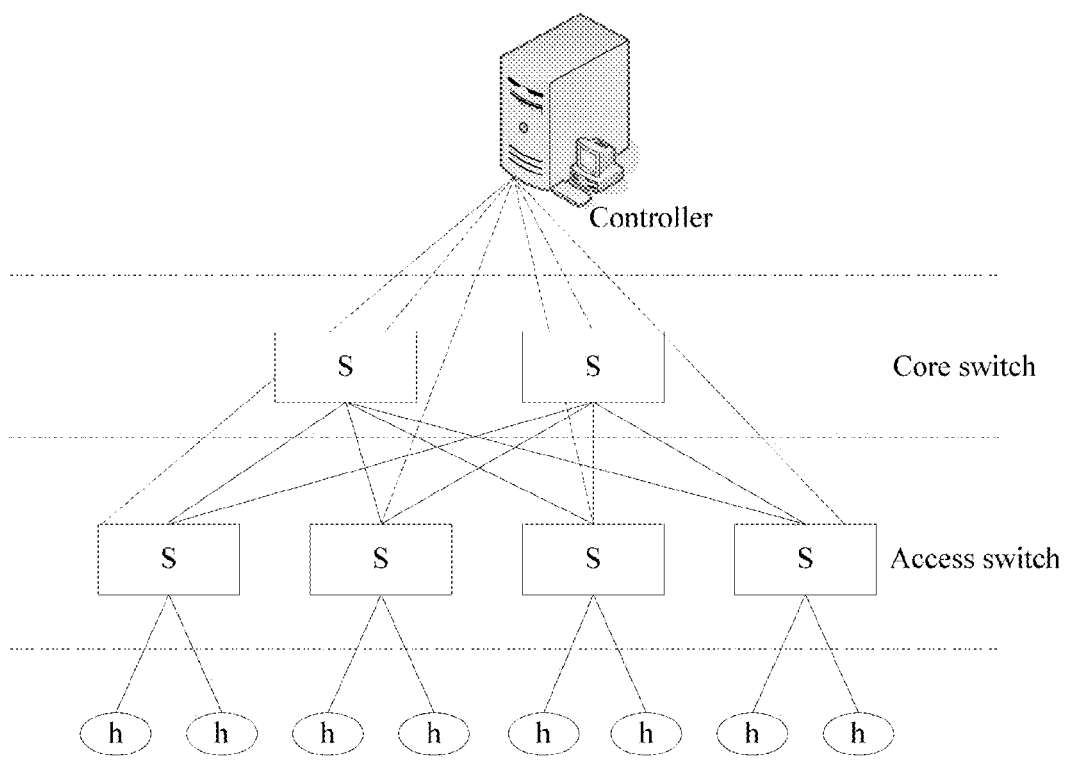
FIG. 1 is a schematic diagram of an SDN-based network architecture.
Figure 2:
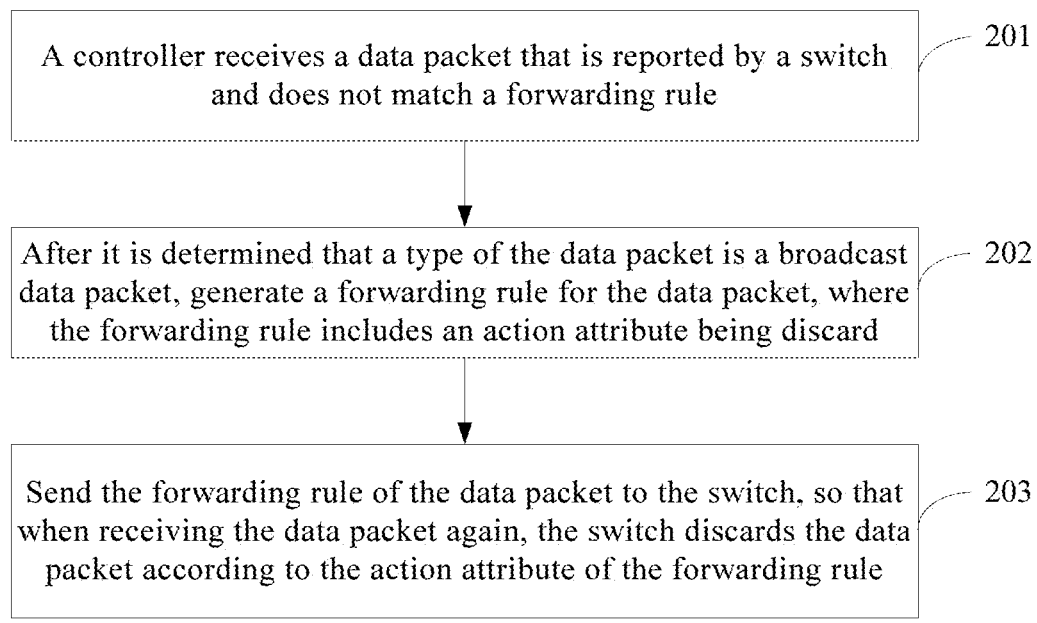
FIG. 2 is a flowchart of an embodiment of a method for processing a data packet according to the present invention.

Referring to FIG. 2, FIG. 2 is a flowchart of an embodiment of a method for processing a data packet according to the present invention. This embodiment describes a process of broadcasting a data packet from a controller side.

Step 201: A controller receives a data packet that is reported by a switch and does not match a forwarding rule.

When the switch does not match a forwarding rule of the data packet, it indicates that the data packet is a data packet received by the switch for the first time. In this case, the switch reports the data packet to the controller, and requests the controller to deliver a forwarding policy for the data packet.

Step 202: After it is determined that a type of the data packet is a broadcast data packet, generate a forwarding rule for the data packet, where the forwarding rule includes an action attribute being discarded.

Because a broadcast data packet causes a broadcast storm on a fully-connected network, in this embodiment, the controller needs to identify the type of the data packet, so as to perform processing on the broadcast data packet. The type of the data packet may be identified according to a destination Medium/Media Access Control (MAC) address of the data packet. When the destination MAC address is all "F", it can be determined that the type of the data packet is a broadcast data packet.

Because the data packet reported by the switch is the data packet received by the switch for the first time, the controller may generate a forwarding rule for the data packet, where the forwarding rule is subsequently used as a forwarding policy of the data packet. The forwarding rule may include at least one piece of the following information of the data packet: a protocol type, a source address, a destination address, a source port number, a destination port number, a VLAN ID, a VLAN priority, an Ethernet type, and a service type, and the forwarding rule may not include an ingress port of the data packet on the switch. In addition, the forwarding rule further includes the action attribute being discard. Optionally, the forwarding rule may further include aging time.

Optionally, because broadcast data packets may be further subdivided into different types of broadcast data packets, in this embodiment, the controller may further match attribute information of the broadcast data packet with preset attribute information after identifying that the data packet is a broadcast data packet, so as to meet a user's requirements for processing a specific type of broadcast data packet. The set attribute information may include at least one piece of the following information: a protocol type, a source address, a destination address, a source port number, a destination port number, a VLAN ID, a VLAN priority, and an Ethernet type. For example, for an Address Resolution Protocol (ARP) data packet and a Dynamic Host Configuration Protocol (DHCP) data packet that both are broadcast data packets, if a user customizes that this embodiment of the present invention needs to be applied to the ARP data packet, attribute information of the ARP data packet may be preset; when the received data packet is a broadcast data packet, the controller further confirms whether the attribute information of the data packet matches the attribute information of the ARP data packet; and when the attribute information of the data packet matches the attribute information of the ARP data packet, it indicates that the broadcast data packet is an ARP data packet, and a forwarding rule is generated according to the ARP data packet.

Step 203: Send the forwarding rule of the data packet to the switch, so that when receiving the data packet again, the switch discards the data packet according to the action attribute of the forwarding rule.

In this embodiment, for the data packet reported by the switch for the first time, the controller may set the action attribute of the data packet to broadcast, and send the set data packet to the switch, so that the switch is controlled to broadcast the data packet. After the controller sends a forwarding rule to the switch, the switch can store the forwarding rule. Subsequently, when confirming, according to information included in the forwarding rule, that the data packet is received again, the switch may discard, according to the action attribute included in the forwarding rule, the data packet received again, thereby avoiding a broadcast storm on the network.

Further, when the forwarding rule includes aging time, the switch may discard the data packet when receiving the data packet again within the aging time.

It can be seen from the foregoing embodiment that when a switch receives a data packet and does not match a forwarding rule of the data packet, the switch reports the data packet to a controller; and after determining that the data packet is a broadcast data packet, the controller generates a forwarding rule for the data packet, and sends the forwarding rule to the switch, where the forwarding rule includes an action attribute being discard. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

Figure 3:
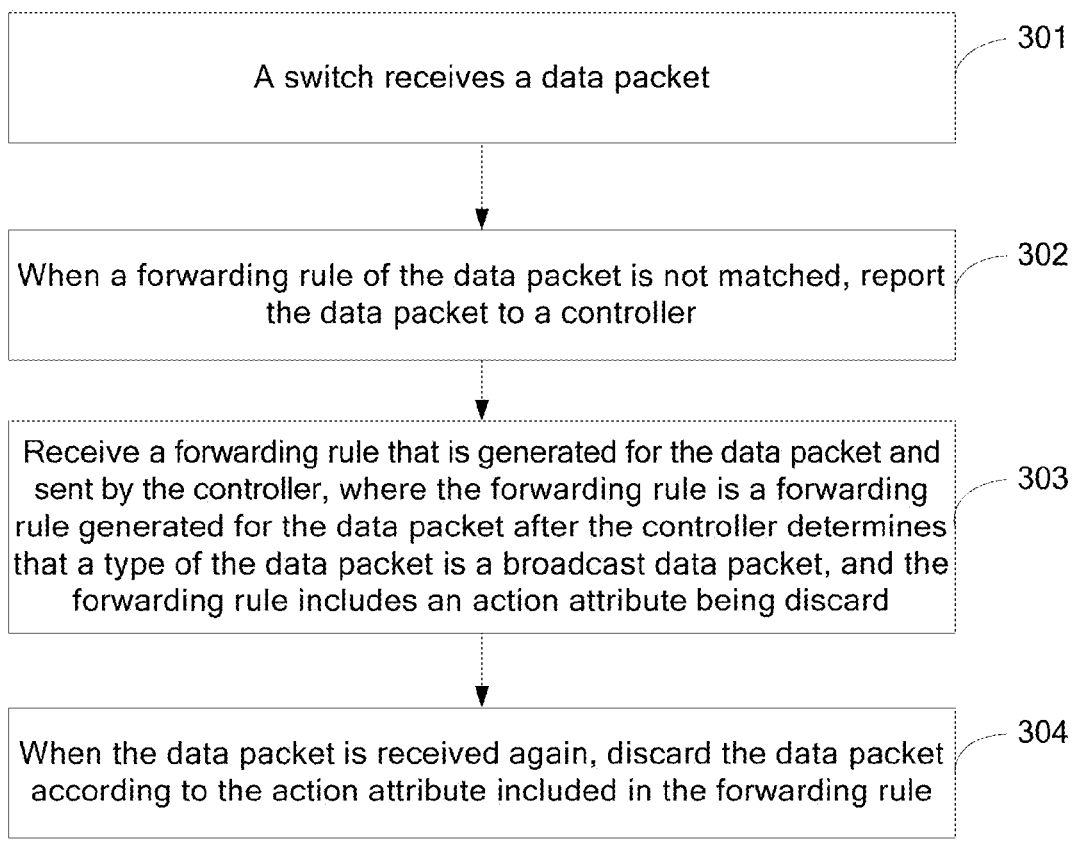
FIG. 3 is a flowchart of another embodiment of a method for processing a data packet according to the present invention.

Referring to FIG. 3, FIG. 3 is a flowchart of another embodiment of a method for processing a data packet according to the present invention. This embodiment describes a process of broadcasting a data packet from a switch side.

Step 301: A switch receives a data packet.

Step 302: When a forwarding rule of the data packet is not matched, report the data packet to a controller.

When the switch does not match a forwarding rule of the data packet, it indicates that the data packet is a data packet received by the switch for the first time. In this case, the switch reports the data packet to the controller, and requests the controller to deliver a forwarding policy for the data packet.

Step 303: Receive a forwarding rule that is generated for the data packet and sent by the controller, where the forwarding rule is a forwarding rule generated for the data packet after the controller determines that a type of the data packet is a broadcast data packet, and the forwarding rule includes an action attribute being discarded.

Because a broadcast data packet causes a broadcast storm on a fully-connected network, in this embodiment, the controller needs to identify the type of the data packet, so as to perform processing on the broadcast data packet. The type of the data packet may be identified according to a destination MAC address of the data packet. When the destination MAC address is all "F", it can be determined that the type of the data packet is a broadcast data packet.

Because the data packet reported by the switch is a data packet received by the switch for the first time, the controller may generate a forwarding rule according to the data packet, where the forwarding rule is subsequently used as a forwarding policy of the data packet. The forwarding rule may include at least one piece of the following information of the data packet: a protocol type, a source address, a destination address, a source port number, a destination port number, a VLAN ID, a VLAN priority, an Ethernet type, and a service type, and the forwarding rule may not include an ingress port of the data packet on the switch. In addition, the forwarding rule further includes the action attribute being discard. Optionally, the forwarding rule may further include aging time.

Optionally, because broadcast data packets may be further subdivided into different types of broadcast data packets, in this embodiment, the controller may further match attribute information of the broadcast data packet with preset attribute information after identifying that the data packet is a broadcast data packet, so as to meet a user's requirements for processing a specific type of broadcast data packet. The set attribute information may include at least one piece of the following information: a protocol type, a source address, a destination address, a source port number, a destination port number, a VLAN ID, a VLAN priority, and an Ethernet type.

In this embodiment, for the data packet reported by the switch for the first time, the controller may set the action attribute of the data packet to broadcast, and send the set data packet to the switch; the switch broadcasts the data packet on the network according to the action attribute of the data packet; after the switch receives a forwarding rule that is generated by the controller according to the data packet, the switch can store the forwarding rule.

Step 304: When the data packet is received again, discard the data packet according to the action attribute included in the forwarding rule.

When confirming, according to information included in the forwarding rule, that the data packet is received again, the switch may discard, according to the action attribute included in the forwarding rule, the data packet received again, thereby avoiding a broadcast storm on the network.

It can be seen from the foregoing embodiment that when a switch receives a data packet and does not match a forwarding rule of the data packet, the switch reports the data packet to a controller; and after determining that the data packet is a broadcast data packet, the controller generates a forwarding rule for the data packet, and sends the forwarding rule to the switch, where the forwarding rule includes an action attribute being discarded. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

Figure 4A:
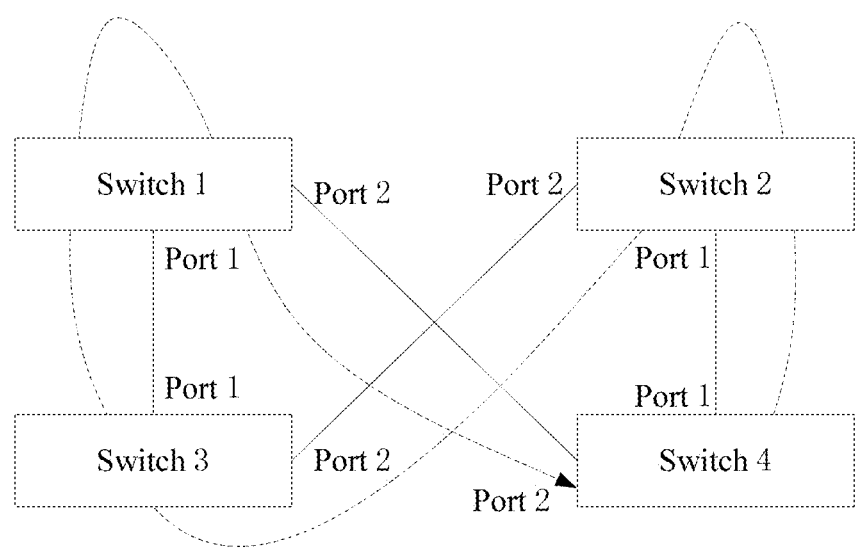
FIG. 4A is a schematic diagram of a connection of switches on a fully-connected network applied in an embodiment of the present invention.

Referring to FIG. 4A, FIG. 4A is a schematic diagram of a connection of switches on a fully-connected network applied in an embodiment of the present invention. In FIG. 4A, core switches include a switch 1 and a switch 2, and access switches include a switch 3 and a switch 4, where the switch 1 and the switch 2 are connected to the switch 3 and the switch 4 respectively, and each switch includes a port 1 and a port 2. In FIG. 4A, a solid line connected between ports represents a link connection between switches, and a dashed line represents a flow direction of a data packet transmitted in the foregoing link. Four switches shown in FIG. 4A are all connected to a controller, where the controller is not shown in FIG. 4A.

Figure 4B:
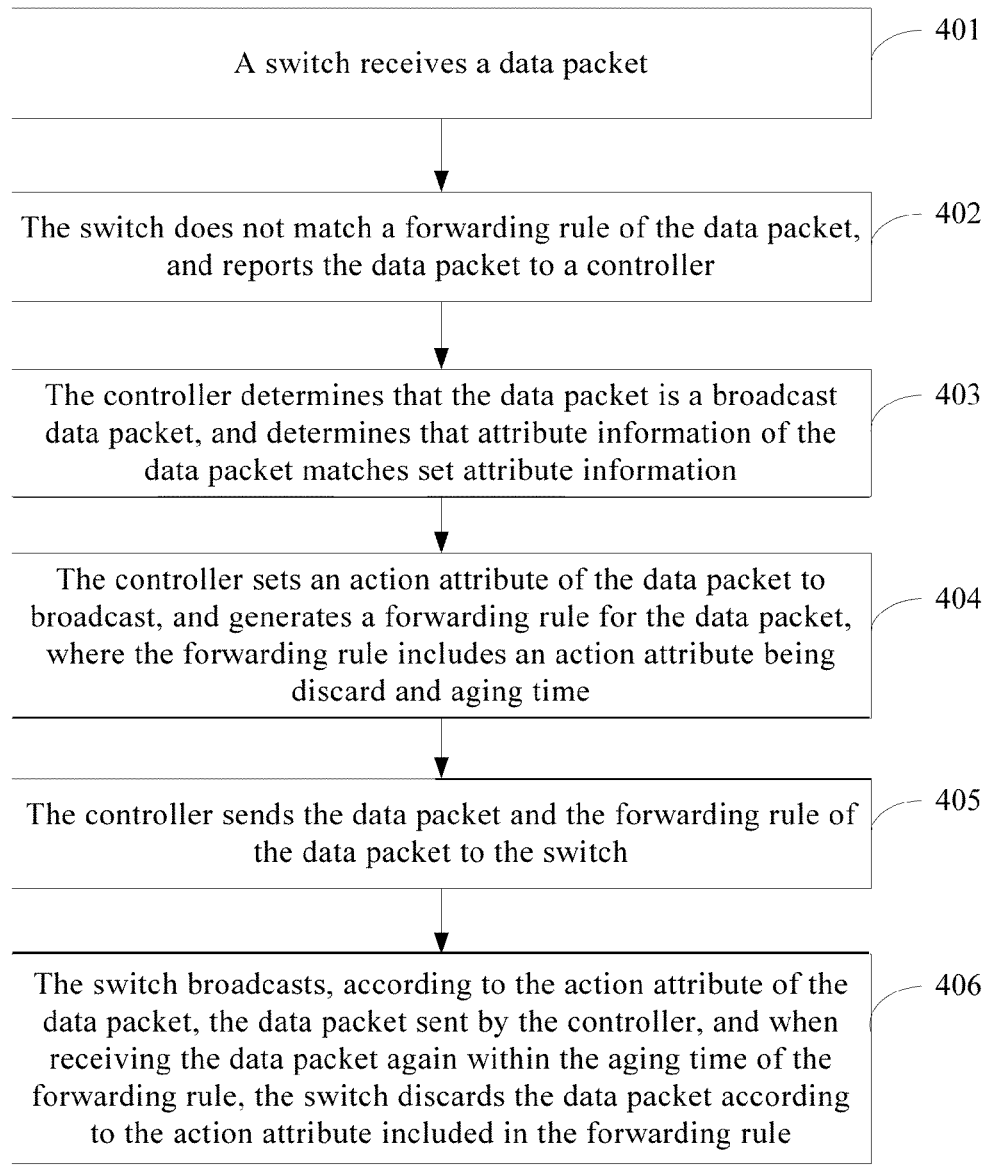
FIG. 4B is a flowchart of another embodiment of a method for processing a data packet with reference to FIG. 4A according to the present invention.

Referring to FIG. 4B, FIG. 4B is a flowchart of a third embodiment of a method for broadcasting a data packet according to the present invention. This embodiment describes, with reference to FIG. 4A, a process of processing a data packet in detail.

Step 401: A switch receives a data packet.

With reference to FIG. 4A, it is assumed that the port 2 of the switch 4 receives a data packet.

Step 402: The switch does not match a forwarding rule of the data packet, and reports the data packet to a controller.

It is assumed that the data packet received by the port 2 of the switch 4 is a data packet received by the switch 4 for the first time. Therefore, the switch 4 does not match a forwarding rule of the data packet, and the switch 4 reports the data packet to the controller, and requests the controller to deliver a forwarding policy for the data packet.

Step 403: The controller determines that the data packet is a broadcast data packet, and determines that attribute information of the data packet matches set attribute information.

When the controller identifies that a destination MAC address of the data packet is all "F", it can be determined that the data packet is a broadcast data packet. Then, the controller matches attribute information of the broadcast data packet with preset attribute information, where the set attribute information may include at least one piece of the following information: a protocol type, a source address, a destination address, a source port number, a destination port number, a VLAN ID, a VLAN priority, and an Ethernet type. Assuming that the attribute information preset by a user in this embodiment is a protocol type ARP, after the controller identifies the broadcast data packet, a subsequent step 404 is further executed when it is further determined that a protocol type of the broadcast data packet is ARP.

Step 404: The controller sets an action attribute of the data packet to broadcast, and generates a forwarding rule for the data packet, where the forwarding rule includes an action attribute being discard and aging time.

In this embodiment, for a data packet reported by the switch 4 for the first time, the controller sets an action attribute of the data packet to broadcast, so that the switch 4 can broadcast the data packet received for the first time. In addition, the controller generates a forwarding rule for the data packet received by the switch 4, where the forwarding rule may include at least one piece of the following information of the data packet: a protocol type, a source address, a destination address, a source port number, a destination port number, a VLAN ID, a VLAN priority, an Ethernet type, and a service type, and the forwarding rule may not include an ingress port of the data packet on the switch. When the forwarding rule is generated, the action attribute being discard and the aging time are further included, so that when receiving the data packet again, the switch 4 can discard, according to the action attribute, the data packet received again within the set aging time.

Step 405: The controller sends the data packet and the forwarding rule of the data packet to the switch.

Step 406: The switch broadcasts, according to the action attribute of the data packet, the data packet sent by the controller, and when receiving the data packet again within the aging time of the forwarding rule, the switch discards the data packet according to the action attribute included in the forwarding rule.

With reference to FIG. 4A, for the data packet reported by the switch 4 in step 402, the switch 4 can broadcast, according to the action attribute set in the data packet, the data packet by using the port 1, after receiving the data packet delivered by the controller. Subsequently, when the switch 4 receives the data packet matching information in the forwarding rule again and the aging time of the forwarding rule does not expire, the switch 4 can discard the data packet, thereby avoiding a broadcast storm on the network.

In FIG. 4A, when the switch 4 broadcasts the received data packet to the port 1 of the switch 2 by using the port 1, the switch 2 executes a process the same as that executed by the foregoing switch 4. Similarly, when the switch 3 and the switch 1 receive a data packet transmitted according to a transmission direction of the data packet in FIG. 4B, the switch 3 and the switch 1 execute the process the same as that executed by the foregoing switch 4, which is not further described herein.

It can be seen from the foregoing embodiment that when a switch receives a data packet and does not match a forwarding rule of the data packet, the switch reports the data packet to a controller; and after determining that the data packet is a broadcast data packet, the controller generates a forwarding rule for the data packet, and sends the forwarding rule to the switch, where the forwarding rule includes an action attribute being discard. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

Figure 5:
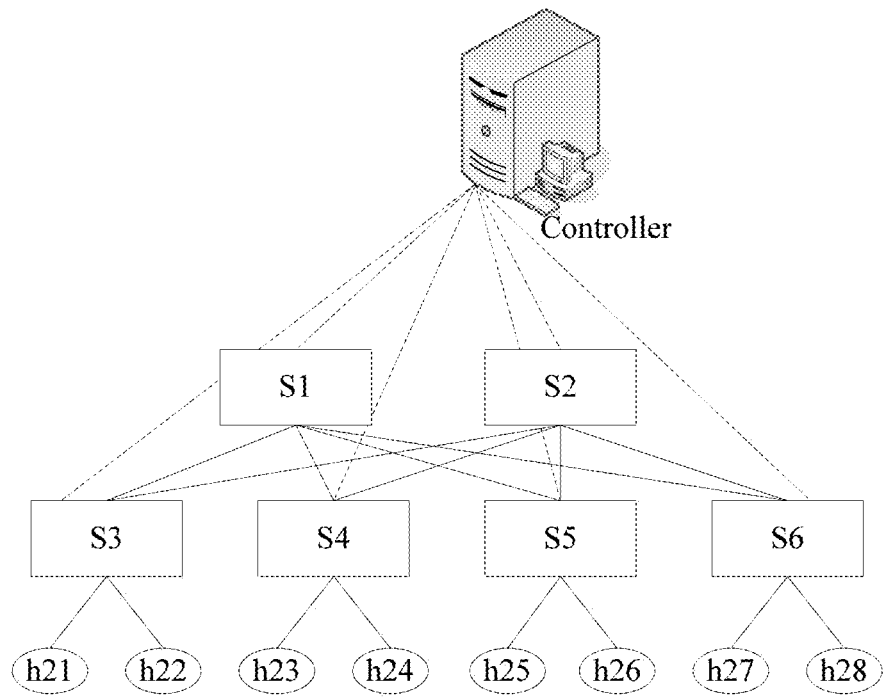
FIG. 5 is a schematic diagram of a network architecture applying an embodiment of the present invention.

Referring to FIG. 5, FIG. 5 is a schematic diagram of a network architecture applying an embodiment of the present invention. In FIG. 5, a controller is connected to switches S1, S2, S3, S4, S5, and S6, the S3 is connected to hosts h21 and h22, the S4 is connected to hosts h23 and h24, the S5 is connected to hosts h25 and h26, and the S6 is connected to host h27 and h28. It is assumed that the host 21 sends an ARP request data packet on a network to request a MAC address of the h27 and that the ARP request data packet is a broadcast data packet that needs to be controlled by using this embodiment of the present invention. With reference to FIG. 5, the following describes an example of processing a data packet applying this embodiment of the present invention. The processing process is implemented based on Open-Flow of an SDN technology. The processing process is as follows.

The host h21 sends an ARP request data packet to the switch S3.

The switch S3 searches for a forwarding rule of the ARP request data packet; when the switch S3 does not find a forwarding rule matching the APR request data packet, the switch S3 reports the ARP request data packet to the controller in a form of "PacketIn" defined in the OpenFlow, and requests the controller for a forwarding policy.

After receiving the ARP request data packet, the controller learns a source MAC address and a source Internet Protocol (IP) address of the host h21 by using the ARP request data packet, and identifies that the data packet is an ARP data packet according to a protocol type "0x0806" of the ARP request data packet. Therefore, the controller sets an action (action attribute) of the ARP request data packet to broadcast, and sends the ARP request data packet to the switch S3 in a form of "PacketOut" defined in the OpenFlow. In addition, the controller generates an accurately matched forwarding rule according to the ARP request data packet, where the forwarding rule may not include an ingress port of the data packet on the switch, and the controller sets the action attribute of the forwarding rule to discard and may set aging time of the forwarding rule to 5 seconds (s), where the forwarding rule may include 11 tuples. Subsequently, when the switch S3 receives a data packet matching the 11 tuples in the forwarding rule again, the switch S3 discards the data packet, so as to avoid occurrence of a broadcast storm, where examples of the 11 tuples included in the forwarding rule may be shown as follows: match=OFMatch[dl_dst=ff:ff:ff:ff:ff:ff,dl_src=00:00:00:00:00:16,dl_type=0x806,dl_vlan=0xffff, dl_vpcp=0, nw_dst=10.0.0.32,nw_src=10.0.0.22,nw_proto=1, nw_tos=0,tp_dst=1,tp_src=0], where a first tuple dl_dst represents an Ethernet destination address, a second tuple dl_src represents an Ethernet source address, a third tuple dl_type represents an Ethernet frame type, a fourth tuple dl_vlan represents a VLAN ID, a fifth tuple dl_vpcp represents a VLAN priority, a sixth tuple nw_dst represents a destination IP address (IP destination address), a seventh tuple nw_src represents a source IP address (IP source address), an eighth tuple nw_proto represents a network layer protocol type or lower 8 bits of ARP Operation code (IP protocol or lower 8 bits of ARP Operation code), a ninth tuple nw_tos represents an IP type of service, a tenth tuple tp_dst represents a Transmission Control Protocol (TCP) or User Datagram Protocol (UDP) destination port number (TCP/UDP destination port), and an eleventh tuple tp_src represents a TCP or UDP source port number (TCP/UDP source port).

The switch S3 transmits, according to a transmission direction of the data packet, the ARP request data packet to the switch S6 connected to the host h27. When each switch involved in the foregoing transmission process receives the ARP request data packet, the switch executes a process the same as that executed by the switch S3, which is not further described herein.

After broadcasting the ARP request data packet to the host h27, the switch S6 obtains an ARP reply data packet sent by the host h27. The switch S6 does not have a forwarding rule matching the ARP reply data packet, and then the switch S6 reports the reply data packet to the controller, and requests a forwarding policy of the ARP reply data packet.

After receiving the ARP reply data packet, the controller transmits the ARP reply data packet to the host h21 according to the learned source MAC address and source IP address of the host h21 in a unicast manner, so that the host h21 learns the MAC address of the host h27.

Corresponding to the embodiments of the method for processing a data packet of the present invention, the present invention further provides embodiments of a controller, an apparatus for processing a data packet, a switch, and a system for processing a data packet. The embodiments are the controller, the apparatus, the switch, and the system that are configured to execute the foregoing method embodiments. For related descriptions, reference may be made to the descriptions of the foregoing method embodiments.

Figure 6:
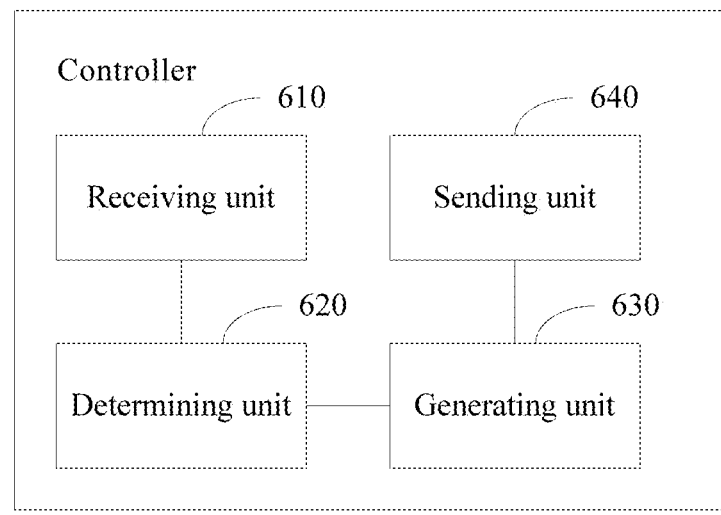
FIG. 6 is a block diagram of an embodiment of a controller according to the present invention.

Referring to FIG. 6, FIG. 6 is a block diagram of an embodiment of a controller according to the present invention.

The controller includes a receiving unit 610, a determining unit 620, a generating unit 630, and a sending unit 640.

The receiving unit 610 is configured to receive a data packet that is reported by a switch and does not match a forwarding rule.

The determining unit 620 is configured to determine that a type of the data packet received by the receiving unit 610 is a broadcast data packet.

The generating unit 630 is configured to, after the determining unit 620 determines that the type of the data packet is a broadcast data packet, generate a forwarding rule for the data packet, where the forwarding rule includes an action attribute being discarded.

The sending unit 640 is configured to send the forwarding rule of the data packet generated by the generating unit 630 to the switch, so that when receiving the data packet again, the switch discards the data packet according to the action attribute of the forwarding rule.

Optionally, the forwarding rule generated by the generating unit 630 further includes aging time, so that the switch discards the data packet when receiving the data packet again within the aging time.

Optionally, the determining unit 620 may be further configured to, when it is determined that attribute information of the data packet matches set attribute information, trigger the generating unit 630 to execute generating a forwarding rule for the data packet, where the set attribute information includes at least one piece of the following information: a protocol type, a source address, a destination address, a source port number, a destination port number, a VLAN ID, a VLAN priority, and an Ethernet type.

Optionally, the controller may further include a setting unit (not shown in FIG. 6) configured to set the action attribute of the data packet received by the receiving unit 610 to broadcast; and the sending unit 640 is further configured to send, to the switch, the data packet of which action attribute is set to broadcast by the setting unit, so that the switch broadcasts the data packet according to the action attribute of the data packet.

It can be seen from the foregoing embodiment that a controller receives a data packet that is reported by a switch and does not match a forwarding rule; and after determining that the data packet is a broadcast data packet, the controller generates a forwarding rule for the data packet, and sends the forwarding rule to the switch, where the forwarding rule includes an action attribute being discarded. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

Figure 7:
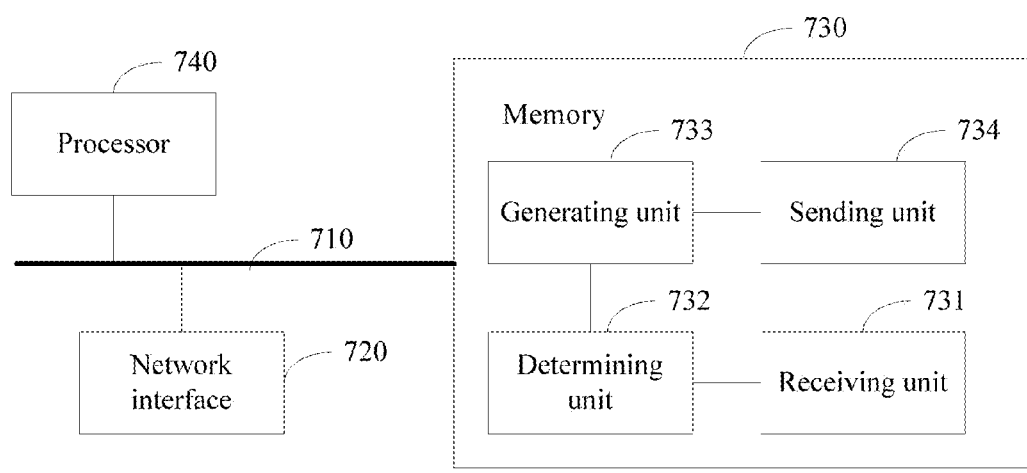
FIG. 7 is a block diagram of an embodiment of an apparatus for processing a data packet according to the present invention.

Referring to FIG. 7, FIG. 7 is an apparatus for processing a data packet disclosed by an embodiment of the present invention.

The processing apparatus includes at least one communication bus 710, at least one network interface 720, a memory 730, and at least one processor 740.

The communication bus 710 is configured to connect all components of the processing apparatus, including the network interface 720, the memory 730, and the processor 740, so as to implement communication between the foregoing components.

The network interface 720 is configured to implement network access.

The memory 730 includes a receiving unit 731 configured to receive a data packet that is reported by a switch and does not match a forwarding rule; a determining unit 732 configured to determine that a type of the data packet received by the receiving unit 731 is a broadcast data packet. Optionally, the determining unit 732 may be further configured to, when it is determined that attribute information of the data packet matches set attribute information, trigger the generating unit 733 to execute generating a forwarding rule for the data packet, where the set attribute information includes at least one piece of the following information: a protocol type, a source address, a destination address, a source port number, a destination port number, a VLAN ID, a VLAN priority, and an Ethernet type; a generating unit 733 configured to, after the determining unit 732 determines that the type of the data packet is a broadcast data packet, generate a forwarding rule for the data packet, where the forwarding rule includes an action attribute being discard. Optionally, the forwarding rule generated by the generating unit 733 may further include aging time, so that the switch discards the data packet when receiving the data packet again within the aging time; and a sending unit 734 configured to send the forwarding rule of the data packet generated by the generating unit 733 to the switch, so that when receiving the data packet again, the switch discards the data packet according to the action attribute of the forwarding rule.

Optionally, the memory 730 may further include a setting unit (not shown in FIG. 7) configured to set the action attribute of the data packet received by the receiving unit 731 to broadcast; and the sending unit 734 is further configured to send, to the switch, the data packet of which action attribute is set to broadcast by the setting unit, so that the switch broadcasts the data packet according to the action attribute of the data packet.

The processor 740 is configured to execute functions of all units in the memory 730.

It can be seen from the foregoing embodiment that a controller receives a data packet that is reported by a switch and does not match a forwarding rule; and after determining that the data packet is a broadcast data packet, the controller generates a forwarding rule for the data packet, and sends the forwarding rule to the switch, where the forwarding rule includes an action attribute being discard. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

Figure 8:
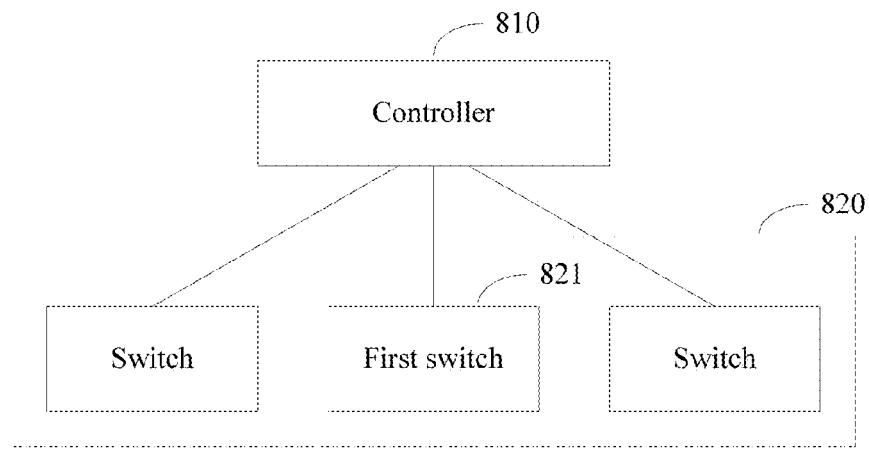
FIG. 8 is a block diagram of an embodiment of a system for processing a data packet according to the present invention.

Referring to FIG. 8, FIG. 8 is a block diagram of an embodiment of a system for processing a data packet according to the present invention.

The system includes a controller 810 shown in the foregoing embodiments and a plurality of switches 820 connected to the controller 810, where the plurality of switches 820 form a ring network, and any one switch of the plurality of switches 820 is a first switch 821. For convenience in giving a demonstration, FIG. 8 shows only three switches 820, and one switch among the three switches is set to the first switch 821 described in this embodiment.

The first switch 821 is configured to receive a forwarding rule of a data packet sent by the controller 810, where the forwarding rule of the data packet includes an action attribute being discard; and is further configured to discard the data packet according to the action attribute of the forwarding rule of the data packet after receiving the data packet again.

For specific descriptions of the controller 810 in the foregoing embodiment, reference may be made to the embodiments shown in the foregoing FIG. 6 and FIG. 7, which is not further described herein.

It can be seen from the foregoing embodiment that when a switch receives a data packet and does not match a forwarding rule of the data packet, the switch reports the data packet to a controller; and after determining that the data packet is a broadcast data packet, the controller generates a forwarding rule for the data packet, and sends the forwarding rule to the switch, where the forwarding rule includes an action attribute being discarded. Because the switch is located on a fully-connected network, when the switch receives the data packet again, the switch can match the forwarding rule of the data packet, and discard the data packet according to the action attribute of the forwarding rule of the data packet, thereby preventing the switch from broadcasting the data packet repeatedly and avoiding occurrence of a broadcast storm. In addition, in the present invention, a broadcast storm on a network can be avoided without shielding a port of a switch. Therefore, for a fully-connected network, a forwarding capability of a port and a quantity of available transmission links on the network are ensured, and a utilization rate of the transmission links on the network is increased accordingly.

A person skilled in the art may clearly understand that technologies in the embodiments of the present invention may be implemented by software in addition to a necessary universal hardware platform. Based on such an understanding, the technical solutions of the present invention essentially or the part contributing to the prior art may be implemented in a form of a software product. The software product is stored in a readable storage medium, such as a read-only memory (ROM)/random-access memory (RAM), a disk, or an optical disc, and includes several instructions for instructing a computer device (which may be a personal computer, a server, or a network device) to perform the methods described in the embodiments of the present invention.

In each embodiment of the specification, description is provided by using a progressive way. Identical and similar parts in each embodiment may refer to each other, and each embodiment focuses on parts different from other embodiments. In particular, since the system embodiments are basically similar to the method embodiments, the descriptions of the system embodiments are relatively simple. For details about related contents, reference may be made to the descriptions of the method embodiments.

The foregoing embodiments of the present invention are not intended to limit the protection scope of the present invention. Any modification, equivalent replacement, and improvement made without departing from the spirit and principle of the present invention shall fall within the protection scope of the present invention.

What is claimed is:

1. A method for processing a data packet, comprising:
   receiving, by a controller, the data packet that is reported by a switch and does not match a forwarding rule;
   generating a forwarding rule for the packet after it is determined that a type of the data packet is a broadcast data packet, wherein the forwarding rule comprises an action attribute being discarded; and
   sending the forwarding rule of the data packet to the switch such that when receiving the data packet again, the switch discards the data packet according to the action attribute of the forwarding rule.

2. The method according to claim 1, wherein the forwarding rule further comprises aging time such that the switch discards the data packet when receiving the data packet again within the aging time.

3. The method according to claim 1, wherein before generating the forwarding rule for the data packet, the method further comprises determining that attribute information of the data packet matches set attribute information, wherein the set attribute information comprises at least one piece of the following information: a protocol type, a source address, a destination address, a source port number, a destination port number, a virtual local area network identifier (VLAN ID), a virtual local area network (VLAN) priority, and an Ethernet type.

4. The method according to claim 1, wherein before sending the forwarding rule of the data packet to the switch, the method further comprises:
   setting the action attribute of the data packet to broadcast; and
   sending the data packet to the switch such that the switch broadcasts the data packet according to the action attribute of the data packet.

5. The method according to claim 1, wherein the forwarding rule comprises at least one piece of the following information of the data packet: a protocol type, a source address, a destination address, a source port number, a destination port number, a virtual local area network identifier (VLAN ID), a virtual local area network (VLAN) priority, an Ethernet type, and a service type.

6. A controller, comprising:
   a receiving unit configured to receive a data packet that is reported by a switch and does not match a forwarding rule;
   a determining unit configured to determine that a type of the data packet received by the receiving unit is a broadcast data packet;
   a generating unit configured to, after the determining unit determines that the type of the data packet is a broadcast data packet, generate a forwarding rule for the data packet, wherein the forwarding rule comprises an action attribute being discarded; and
   a sending unit configured to send the forwarding rule of the data packet generated by the generating unit to the switch such that when receiving the data packet again, the switch discards the data packet according to the action attribute of the forwarding rule.

7. The controller according to claim 6, wherein the forwarding rule generated by the generating unit further comprises aging time such that the switch discards the data packet when receiving the data packet again within the aging time.

8. The controller according to claim 6, wherein the determining unit is further configured to, when it is determined that attribute information of the data packet matches set attribute information, trigger the generating unit to execute generating a forwarding rule for the data packet, wherein the set attribute information comprises at least one piece of the following information: a protocol type, a source address, a destination address, a source port number, a destination port number, a virtual local area network identifier (VLAN ID), a virtual local area network (VLAN) priority, and an Ethernet type.

9. The controller according to claim 6, further comprising a setting unit configured to set the action attribute of the data packet received by the receiving unit to broadcast, and wherein the sending unit is further configured to send, to the switch, the data packet of which action attribute is set to broadcast by the setting unit such that the switch broadcasts the data packet according to the action attribute of the data packet.

10. A system for processing a data packet, comprising:
a controller; and
a plurality of switches connected to the controller,
wherein the plurality of switches form a ring network, and any one switch of the plurality of switches is a first switch,
wherein the controller is configured to receive a data packet that is reported by the first switch and does not match a forwarding rule, determine that a type of the data packet is a broadcast data packet, then generate a forwarding rule for the data packet, wherein the forwarding rule comprises an action attribute being discarded, and wherein the controller is further configured to send the forwarding rule of the data packet to the first switch, and
wherein the first switch is configured to receive the forwarding rule of a data packet sent by the controller, and wherein the first switch is further configured to discard, after receiving the data packet again, the data packet according to the action attribute of the forwarding rule of the data packet.

11. The system according to claim 10, wherein the forwarding rule generated by the controller further comprises aging time such that the first switch discards the data packet when receiving the data packet again within the aging time.

12. The system according to claim 11, wherein the controller is further configured to, before generating the forwarding rule for the data packet, determine that attribute information of the data packet matches set attribute information, wherein the set attribute information comprises at least one piece of the following information: a protocol type, a source address, a destination address, a source port number, a destination port number, a virtual local area network identifier (VLAN ID), a virtual local area network (VLAN) priority, and an Ethernet type.

13. The system according to claim 11, wherein the controller is further configured to set the action attribute of the data packet to broadcast, and send the data packet to the first switch, and wherein the first switch is further configured to broadcast the data packet according to the action attribute of the data packet.

* * * * *